UNITED STATES PATENT OFFICE.

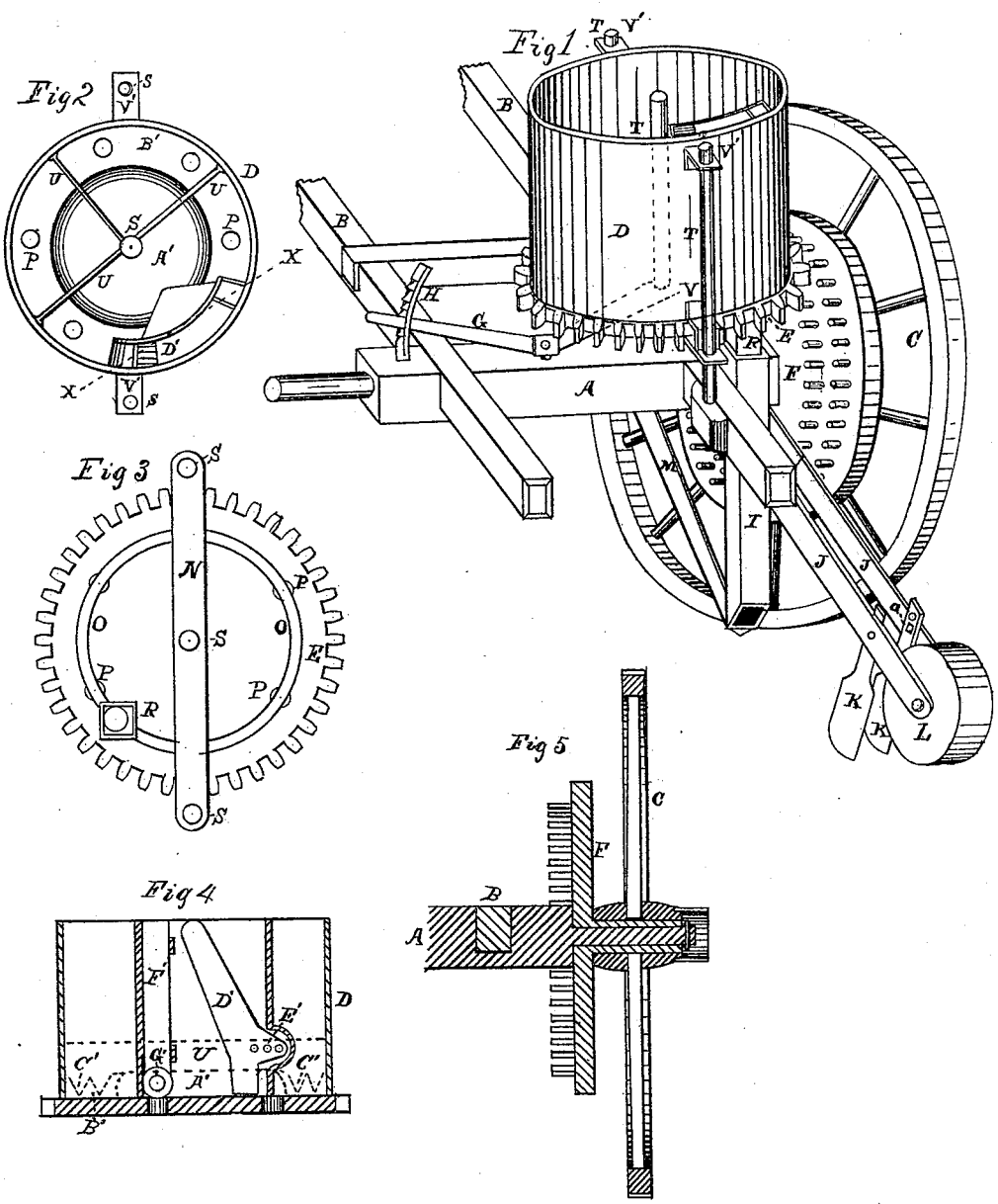

ABNER N. NEWTON, OF RICHMOND, INDIANA, ASSIGNOR TO GREENVILLE E. JONES, PHINEAS LAMB, AND JOSEPH G. LEMON, OF SAME PLACE.

IMPROVEMENT IN CORN-PLANTERS.

Specification forming part of Letters Patent No. 175,620, dated April 4, 1876; application filed October 11, 1875.

*To all whom it may concern:*

Be it known that I, ABNER N. NEWTON, of Richmond, county of Wayne and State of Indiana, have invented certain Improvements in Corn-Planters, of which the following is a specification:

This invention relates to corn planters or drills, having various devices which are arranged to be readily adapted for a single or double row dropper, at pleasure, as will be more fully hereinafter described and set forth in the claims.

Figure 1 is a perspective view with the left wheel removed. Fig. 2 is a plan or top view of the hopper, showing the stationary agitators to insure perfect filling of the seed-cells. Fig. 3 is a bottom view of the hopper with the dropper-plate attached. Fig. 4 is a vertical section taken at the line X X, Fig. 2. Fig. 5 is a section showing the manner of attaching the change-wheel to the hub of the drive or ground wheel.

A is the axle; B B, the thills; C, the ground-wheel; D, the hopper; E, the toothed dropper-plate; F, the change-wheel attached to the hub of the ground-wheel. G is a lever, by which the dropper-plate E is raised or lowered into the different sets of teeth in the change-wheel. H is a toothed rack for the purpose of holding the lever G in any desired position. I is the self-adjusting grain-spout, having the arms J J attached, said arms carrying the coverers K and roller L, by which the spout is kept in place and made self-adjusting, the coverers also being adjustable by means of the roller L and set-screws $a$ in the shank of the coverers to raise and lower them, according to the depth it is desired to cover. When adjusted to cover the required depth the roller holds them to that depth, thereby insuring even covering. The bar M is attached to the grain-spout, and pivoted at its forward end to the thill, consequently admits of self-adjustment while the machine is in operation.

The section, Fig. 5, shows the manner of attaching the change-wheel F to the hub of the ground or drive wheel, which may be done by casting the boxing of the hub to the change-wheel; or the boxing may be omitted from the change-wheel, and the wheel attached to the hub in any other suitable manner. N is a cross-bar, attached to the hopper by means of the lugs or arms V. This cross-bar has the circular bar or ring O attached to it, the bar O being of less width than the seed-cells P in the dropper-plate E, for the purpose of making chaff-openings on either side of the circular bar. This bar O also has the spout R attached, which spout passes down inside of the upper end of the grain-spout I, the spout I sliding up and down upon it as it adjusts itself to the work. There are lugs V' attached to the upper end of the hopper. The lugs V and V' slide upon the vertical rods T by their holes S sliding over the rods, the center rod being the pivot upon which the toothed dropper-wheel turns. A', Figs. 2 and 4, is a conical disk, placed in the center of the hopper for the purpose of forming the recess B', into which the grain presses by its own weight, but is kept sufficiently stirred to always fill the seed-cells by means of the pendent agitators C' attached to the cross-bars U. These pendent agitators, in conjunction with the cross-bars U, keep back the grain from crowding the exit-orifice of the hopper or dropper-plate, at the same time keeping the grain sufficiently agitated to insure the filling of the seed-cells. D', Fig. 4, represents a weighted pivoted cut-off, of which any required number may be used. They are placed side by side, as shown at D', Fig. 2, in the recess crossed by the line X X. These weighted pivoted cut-offs have adjusting-holes E', Fig. 4, for the purpose of giving greater or less pressure to the cut-off, as occasion may require. The upper end of these weighted cut-offs leans forward in order that their lower ends may press upon the dropper-plate by means of the weight of the upper end.

The hopper D, dropper-plate E, cross-bar N, and circular bar O act conjointly, and move together in making the different changes, and are moved up or down by means of the lever G applied to the under surface of the bar N at its center. The weighted idler G' rests upon the upper surface of the dropper-plate in line with the seed-cells P, and is made somewhat larger than the cells, but will drop sufficiently into the cells to force the grain out. This idler is attached to the lower end of the upright weight F'.

Having thus fully described my invention, what I claim, and desire to secure by Letters Patent, is—

1. The combination of the toothed dropper-wheel E, hopper D, pivot-rod T, and vertical change-wheel F, for the purpose substantially as described.

2. The conical disk A', having the stationary agitators U and pendent agitators C' attached, in combination with the hopper D, substantially as described.

3. The circular bar O, as shown and described, in combination with the dropper-wheel having the seed-cells P, for the purpose specified.

4. The combination of the bar N and circular bar O attached to the hopper, and having the horizontal toothed dropper-plate E working between the said bars, the whole sliding upon the rods T, substantially as and for the purpose described.

5. The pivoted or hinged cut-off D', made adjustable and in sections, substantially as and for the purpose specified.

6. The self-adjusting grain-spout I, having the bar M pivoted at its front end, in combination with arms J J, carrying the coverers K and roller L, substantially as shown and described.

ABNER N. NEWTON.

Witnesses:
FRANK HUNT,
C. L. SHUTS.